United States Patent [19]

Burack

[11] 4,267,020
[45] May 12, 1981

[54] NUCLEAR STEAM GENERATOR WRAPPER AND SHELL ASSEMBLY AND METHOD FOR ASSEMBLING

[75] Inventor: Robert D. Burack, Pittsburgh, Pa.

[73] Assignee: Westinghouse Electric Corp., Pittsburgh, Pa.

[21] Appl. No.: 933,335

[22] Filed: Aug. 14, 1978

[51] Int. Cl.² .............................................. G21C 15/16
[52] U.S. Cl. ........................................ 176/87; 176/65; 165/76; 165/160
[58] Field of Search ....................... 176/65, 87; 165/76, 165/134, 160

[56] References Cited

U.S. PATENT DOCUMENTS

| | | | |
|---|---|---|---|
| 3,411,988 | 11/1968 | Dufresne et al. | 176/87 |
| 3,782,457 | 1/1974 | Troy | 165/160 X |
| 3,937,651 | 2/1976 | Schabert et al. | 176/65 X |
| 3,962,767 | 6/1976 | Byerley et al. | 165/76 X |
| 4,004,698 | 1/1977 | Gebelin | 165/76 X |
| 4,089,369 | 5/1978 | Lipets et al. | 176/65 X |
| 4,128,126 | 12/1978 | Förster et al. | 176/65 X |
| 4,135,552 | 1/1979 | Mendolia | 176/65 X |
| 4,137,967 | 2/1979 | Hirschie | 176/87 X |

Primary Examiner—Peter A. Nelson
Attorney, Agent, or Firm—E. C. Arenz

[57] ABSTRACT

A nuclear steam generator modularized wrapper assembly comprising at least two separate generally cylindrical wrapper modules with tube support plates therewithin are assembled in stacked relation and joined within the nuclear containment building, the assembled modules then being placed in the shell with the tube apertures in the tube support plates being aligned with the tube apertures in the tube sheet, and a plurality of adjustable spacer means fixed to the outer circumference of the wrapper assembly are provided and are adjusted to vary the width of the space in the annulus between the wrapper and shell at various locations to lock the assembly in place with axial alignment of all of the apertures in the tube support plates and tube sheets. The method of effecting the replacement of a wrapper assembly in the field within the nuclear containment building includes providing tube aperture keying means at selected locations on the upper surface of the tube sheet to promote alignment of all the tube apertures in the various parts, the keying means being removed after the adjustment of the spacer means in the annulus.

2 Claims, 8 Drawing Figures

NUCLEAR STEAM GENERATOR WRAPPER AND SHELL ASSEMBLY AND METHOD FOR ASSEMBLING

BACKGROUND OF THE INVENTION

1. Field of the Invention

The invention pertains to the art of nuclear steam generator construction.

2. Description of the Prior Art

The general way in which new nuclear steam generators are made in the factory is to dispose a generally cylindrical generator shell in a horizontal position in the assembly area. The wrapper which is to be received horizontally into the shell has the general form of a rolled plate which is open along its longitudinal seam. The wrapper has a number of spacer elements strategically located on its outer circumference. This rolled wrapper with its spacers is inserted within the shell and is then expanded radially and welded along the longitudinal seam. Since the shell is not perfectly round, when the wrapper sheet is expanded it follows the non-round conformation of the shell with the result that the wrapper is also not perfectly round.

Tube support plates which are in the form of round discs provided with a large number of holes through which the generator tubes ultimately pass are then inserted into the wrapper plate and fixed at their periphery to the wrapper in generally uniform spacing from each other. The tube support plates are fabricated so that they have a substantially round periphery. However, since the wrapper in being expanded into the shell has been forced into an unround condition, the edges of the plates must be machined at various locations to fit the wrapper. This must also be accomplished with the holes in the series of tube support plates all being in axial alignment with each other from plate to plate.

This construction and the process involved required a relatively long time as well as extensive equipment and manpower, and is accordingly not suited for a field replacement of a wrapper within a nuclear containment building. Field retubing of nuclear steam generators is sometimes desirable when the number of tubes experiencing leaks in a given nuclear steam generator is so large that retubing or replacement of the steam generator must be effected.

Accordingly, it is the aim of the invention to provide a steam generator shell and wrapper construction and method of making the same which reduces the time, equipment and manpower requirements which are now associated with the factory shell and wrapper construction. The construction and method also must accommodate themselves to being carried out in part within a nuclear plant containment building.

SUMMARY OF THE INVENTION

In accordance with the invention the wrapper assembly comprises at least a separate upper and a separate lower module of substantially round cylindrical shape and with vertically spaced tube support plates in the form of apertured substantially round discs therein, the modules being in stacked relation and welded together in the vicinity of the abutting rims of the modules, the wrapper assembly fitting within a steam generator shell to provide an annular space between the assembly and shell, and a plurality of adjustable spacer means are fixed to the outer circumference of the module and are sized to be received in the annular space and adjusted to vary the width of the annular space at selected locations to lock the assembly in place while holding axial alignment of the apertures in the plates and tube sheet in the lower portion of the shell.

In carrying out the method of the invention, a wrapper assembly is replaced above a tube sheet in a nuclear steam generator located in a nuclear plant containment building by fabricating at least two modules, each of which include a plurality of transverse, apertured tube support plates fixed within the modules, introducing each of the modules separately into the containment building and stacking one upon the other with the apertures of the plates in vertical alignment, welding the modules together to provide the wrapper assembly, placing tube aperture keying means on the upper surface of the tube sheet in the shell, elevating the integral wrapper assembly to a location above the shell and then lowering the assembly to proper level in the shell while aligning selected tube apertures in the support plates to register with the keying means resting on the tube sheet, shifting the wrapper assembly by manipulating spacer elements in the annulus formed between the wrapper assembly and the shell to lock the assembly in the shell while getting substantial axial alignment of the support plate tube apertures with the tube sheet apertures and then removing the aperture keying means.

DRAWING DESCRIPTION

DESCRIPTION OF THE PREFERRED EMBODIMENT

Figure 1A:
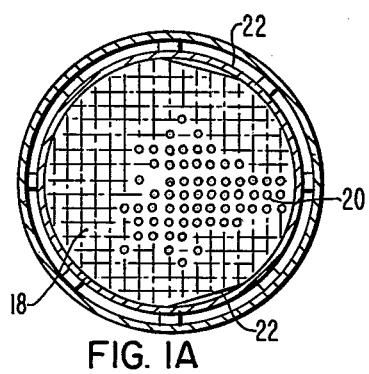
FIGS. 1 and 1A are somewhat simplified partly broken views of a portion of a nuclear steam generator for purposes of explaining the prior art construction.
Figure 1:
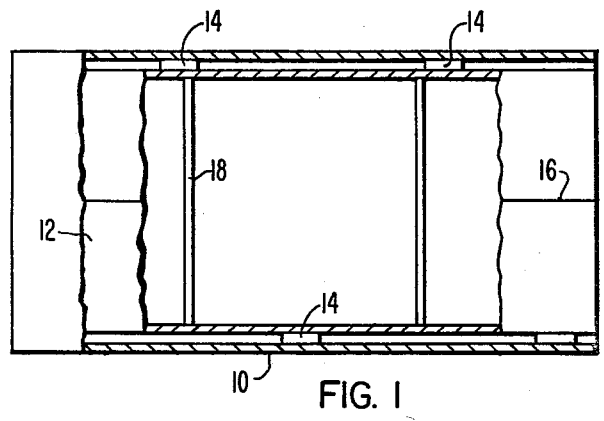

The FIG. 1 showing its illustrative of the prior art way of making the part of a nuclear steam generator with which this invention is concerned. In FIG. 1, the cylindrical generator shell 10 is disposed with its longitudinal axis extending horizontally. The wrapper plate 12, which has been rolled to a diameter somewhat less than the diameter of the shell 10, is inserted through one of the open ends of the shell. The spacer elements 14 are strategically located in the annular space formed between the wrapper and shell. The wrapper is then expanded in a radial direction and following the expansion the longitudinal open seam 16 of the wrapper plate is welded. Since the shell 10 is not perfectly round the expansion of the wrapper plate against the uniform thickness spacers 14 results in the wrapper plate having a conforming non-roundness.

The next step in the prior art method of construction is to insert the series of round tube support plates 18 and fix them within the wrapper plate at spaced intervals. These disc-shaped plates provided with a large number of tube apertures 20 have a substantially round periphery which, as indicated by the exaggerated flats 22 must be machined to fit in the non-round cylindrical wrapper. The machining must also be such that with the successive tube support plates installed and fixed within the wrapper, the tube holes 20 must be in axial alignment.

The described prior construction and method typically takes about three weeks to accomplish under normal factory operating conditions. It is desirable that in a retubing operation in the field within a nuclear containment building that the wrapper and support plates therein should be able to be finally installed within the generator shell within about four days to meet time and personnel schedules related to the field replacement of a number of steam generators within a given containment building.

Figure 2:
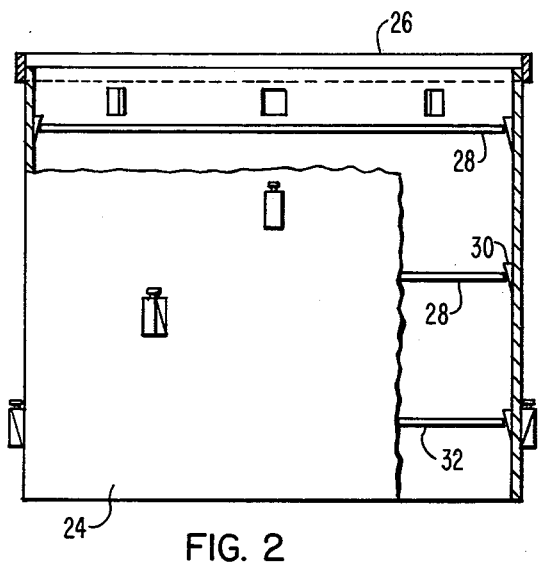
FIG. 2 is a partly broken elevation view of one module of a wrapper assembly according to the invention.
Figure 3:
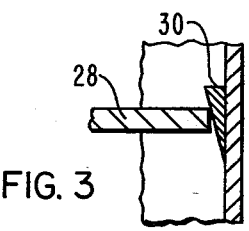
FIG. 3 is a fragmentary detail view partly in section illustrating the junction of the rim of a tube plate with the wrapper barrel.

The wrapper assembly according to this invention is formed of a series of modules, one of which is shown in FIG. 2. The basic parts of each module include the open-ended cylinder 24, a relatively narrow ring 26 encircling the upper rim of the cylinder, a series of apertured tube support plates 28 which are fixed within the cylinder in vertically spaced relation to each other and are fixed in the cylinder by welding the rim at circumferentially spaced locations to the individual wedges 30 (FIG. 3) welded to the inside of the cylinder at correspondingly spaced locations.

A wrapper assembly according to the invention includes at least a separate upper and a separate lower module each of which has the basic construction as described in connection with FIG. 2. However, the lowermost module is provided with a distribution plate 32 which is basically the same as a tube support plate 28 in the sense of having a large number of tube apertures 20, but differs in that it has a central opening of about 3½ feet (1.07 meters) in diameter. With the construction illustrated, the tube support plates and distribution plate may be fixed in place and welded without requiring a machining operation along the edges to fit the plates within the cylinder. Welding of the plates in the module rigidifies the structure and maintains the alignment of the tube holes in the various plates.

Figure 4:
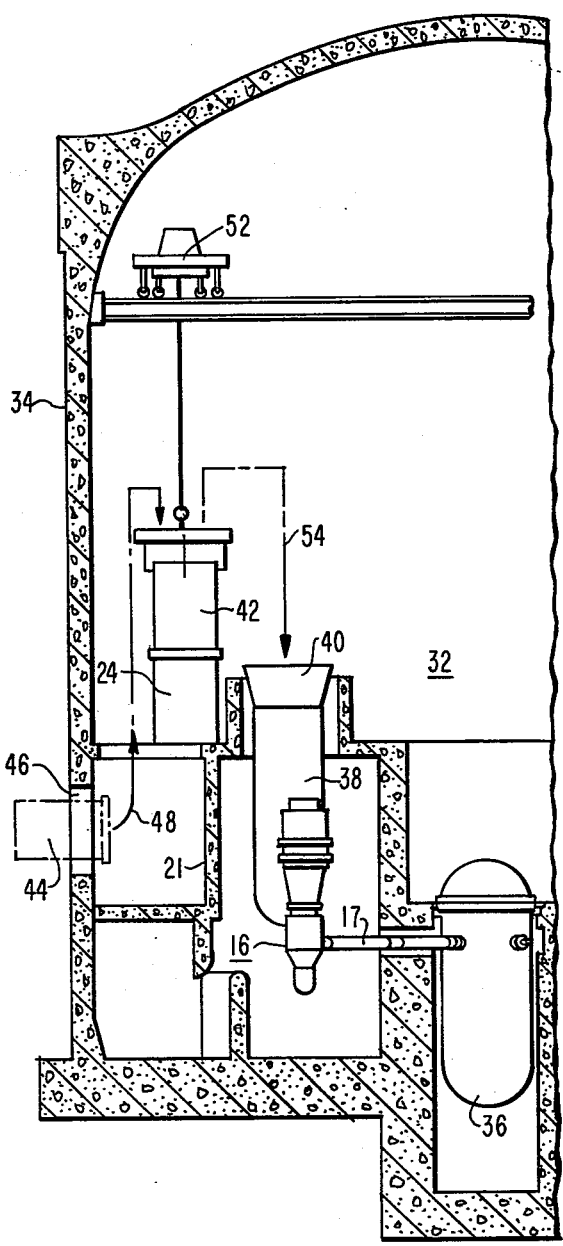
FIG. 4 is a somewhat simplified elevation view partly in section, of a part of a typical nuclear containment building in which retubing of one steam generator is to be carried out.

Referring to FIG. 4, a portion of a typical concrete and steel lined reactor containing building 34 is illustrated, the building housing the reactor primary components including a number of steam generators arrayed around the reactor vessel 36, only the lower shell 38 and transition section 40 of one generator being shown.

Figure 5:
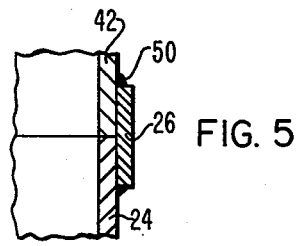
FIG. 5 is a detail view partly in section showing the manner in which adjacent wrapper modules are joined.

When a wrapper assembly comprising two modules for purposes of this example and identified as 24 and 42 are to be installed, they are first brought into the containment building separately and then stacked, 42 and 24, as indicated in the drawing. The dash line block 44 in FIG. 4 is representative of the outline dimensions of a single module which must be brought into the containment building through an access opening 46 of limited size in the wall of the containment building. The dash line arrowed path 48 generally indicates the path which a single module must follow to be brought into the building and placed upon a support floor for the assembly of the two modules to proceed. The upper module 42 is stacked upon the lower module 24 with the lower and upper rims, respectively, abutting, and a weld 50 (FIG. 5) is then applied along the upper edge of the ring 26 to secure the modules to each other to form the completed wrapper assembly. The wrapper assembly as a whole is then lifted by the polar crane 52 to a position above the generator shell 38 and is lowered thereinto as indicated by the dash line arrowed path 54.

Figure 6:
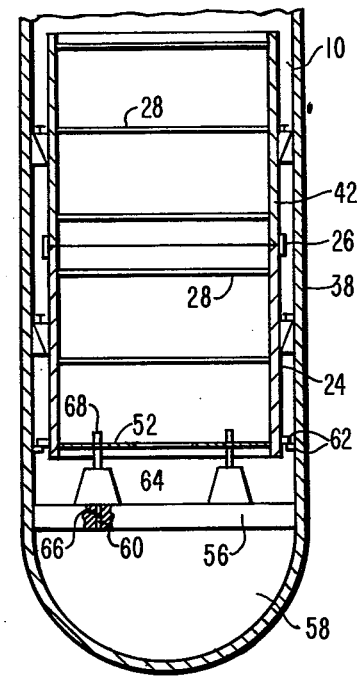
FIG. 6 is a view, mostly in vertical cross section, of a generator shell and wrapper assembly at one stage during the replacement of the wrapper assembly in the shell.

Referring now to FIG. 6, the wrapper assembly comprising the modules 24 and 42 in their joined relation is shown in the lower shell 38 of the nuclear steam generator. As is conventional, the shell includes a relatively thick tube sheet 56 separating the upper portion of the shell from the channel head 58. The tube sheet 56 is provided with a large number of tube holes 60 which correspond in number and array with the tube holes in the tube plates 28 and the distribution plate 32. Before the wrapper assembly is lowered into the shell, means are provided to serve as a stop for the descent of the wrapper assembly to the proper level within the shell. Such stop means may take the form of shear blocks 62 secured to the inner wall of the shell and the outer wall of the wrapper assembly which engage in abutting relation to support the wrapper assembly. Additionally, before the wrapper assembly is lowered, tube aperture keying means are provided to facilitate aligning the tube holes in the tube support plates with the tube holes in the tube sheet. The currently preferred form of such keying means comprises four truncated cone blocks 64, two of which are shown in FIG. 6, each block including a depending pin 66 which is received in a given tube sheet hole, and an upwardly projecting retractable pin 68 which is axially aligned with the depending pin. When the wrapper assembly is lowered into the shell, the four upwardly projecting pins are received in four tube holes in the distribution plate, these four tube holes thereby being axially aligned with the corresponding four bores 60 in the tube sheet 56.

Figure 7:
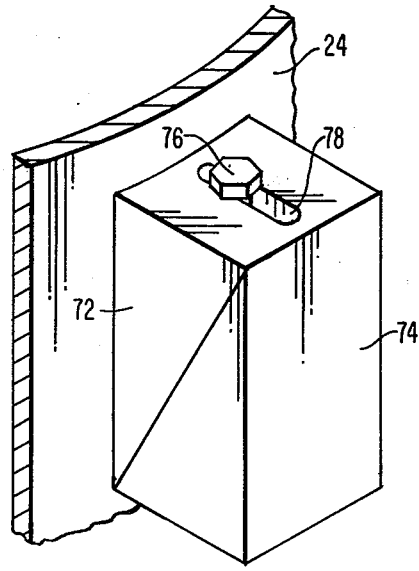
FIG. 7 is a fragmentary isometric view of one form of adjustable spacer means which may be used in carrying out the invention.

With the wrapper assembly in place and the pins on the keying means being in the holes in the distribution plate and in the tube sheet, all of the holes in the various plates are in substantial axial alignment. However, it may be that the alignment can be improved at the same time that the wrapper is being "locked" in place within the shell by using adjustable spacer means disposed in the annulus 70 defined between the wrapper assembly wall and the shell wall. Referring to FIG. 7, one form of adjustable spacer which may be used is illustrated. This spacer simply consists of an expandable wedge arrangement in which one part 72 is secured to the outer face of the wrapper assembly wall and the other triangular part 74 has a threaded bore (not shown) into which is received the threaded end of bolt 76 which extends down through the slot 78 in the first part. Of course, as the bolt 76 is turned further into the bore in part 74, the part 74 will move radially outwardly and the bolt will follow in the slot 78. With the form of adjustable spacer shown in FIG. 7, access to the bolt heads may be obtained from up above down through the annular space 70, with the adjustable expanders being located around the wrapper assembly to permit such access of each one from above. Alternatively, openings may be provided in the wrapper cylinders adjacent these locations since it is not necessary that the annular space 70 be totally out of communication with the internal part of the wrapper assembly.

By adjusting the spacers so that the parts 74 bear against the inner face of the shell wall, the wrapper assembly is locked in place without disturbing its roundness. At the same time, if there is slight axial misalignment of the holes of the tube support plates with the tube sheet holes, a more or less vernier adjustment of the alignment is attainable with the adjustable spacers.

Following locking the wrapper assembly in place, the cone blocks 64 may be removed by an individual entering the space between the distribution plate 32 and the tube sheet 56 through the opening in the center of the distribution plate and the upper pin 68 retracted into the cone blocks and the blocks removed through the access opening. It will be appreciated that a manway is provided through the shell 38 and the wrapper cylinder 24 at that level to permit access between the lowermost tube support plate and the distribution plate. These access manways are subsequently welded shut after the retubing of the generator has been accomplished. The retubing is accomplished in conventional fashion by inserting the U-shaped tubes down through the holes in the tube support plates and finally into the bores in the tube sheet 56.

I claim:

1. A nuclear steam generator internal wrapper assembly and shell construction comprising:

a generally cylindrical shell of a given diameter vertically disposed in a nuclear containment building, said shell having an apertured tube sheet in its lower end portion;

a wrapper assembly comprising at least an upper and a lower separate modules, each module including a substantially round, upright cylinder with vertically spaced apart tube support plates in the form of apertured, substantially round discs therein, said modules being in stacked relation and being welded together in the vicinity of the abutting rims to form the wrapper assembly;

said wrapper assembly being of a sufficiently lesser diameter than said shell as to fit therein with an annular space between said assembly and shell; and a plurality of adjustable spacer means fixed to the outer circumference of said modules and sized to be received in said annular space and adjustable outwardly for locking said wrapper assembly within said shell with substantial axial alignment of the apertures in the plates and sheet, irrespective of variations in width of the annular space at different locations.

2. The method of replacing a wrapper assembly to overlie a tube sheet in the shell of a nuclear steam generator located in a nuclear containment building, comprising:

fabricating at least two modules, each comprising a wrapper cylinder with a plurality of transverse, apertured tube support plates fixed therein in spaced apart relation;

introducing each of the modules separately into the containment building and stacking one upon the other within the building with the apertures of said plates in vertical alignment;

welding the modules together in the vicinity of the adjacent abutting edges of the modules to provide a wrapper assembly comprising at least two of the modules;

placing tube aperture keying means is selected locations on the upper surface of the tube sheet;

elevating said wrapper assembly to a location above said shell and then lowering said shell to its proper level in said shell while aligning selected tube apertures in said support plates to register with said keying means at the selected locations;

shifting said wrapper assembly relative to said shell and locking said assembly in place by manipulating spacer elements in the annulus formed between the wrapper and shell to the extent necessary to provide substantial axial alignment of the support plate tube apertures with the tube sheet apertures; and then removing said aperture keying means.

* * * * *